United States Patent [19]

Carlson et al.

[11] Patent Number: 5,166,690
[45] Date of Patent: Nov. 24, 1992

[54] ARRAY BEAMFORMER USING UNEQUAL POWER COUPLERS FOR PLURAL BEAMS

[75] Inventors: Thomas F. Carlson, Marlborough; Alan J. Glickman, Sudbury, both of Mass.

[73] Assignee: Raytheon Company, Lexington, Mass.

[21] Appl. No.: 813,248

[22] Filed: Dec. 23, 1991

[51] Int. Cl.⁵ .................................................. G01S 3/46
[52] U.S. Cl. ...................................... 342/157; 342/373
[58] Field of Search ................................. 342/157, 373

[56] References Cited

U.S. PATENT DOCUMENTS

4,792,805 12/1988 Miglia ............................. 342/157 X

Primary Examiner—T. H. Tubbesing
Attorney, Agent, or Firm—Walter F. Dawson; Richard M. Sharkansky

[57] ABSTRACT

A multibeam phased array radar includes identical N:1 equal-split combiners and overlay hybrid couplers which form multiple tapered and weighted beams. The radar is configured with a single transmit/receive (T/R) module for each antenna element. The T/R modules contain a high power amplifier for transmit, low noise amplifier for receive, phase shifter for beam steering and attenuator for overall weighting. Each T/R module is connected to an unequal-split coupler which divides the received signal into signals of different amplitudes. Each of these signals are fed into a separate N:1 equal-split combiner, thereby forming separate beams. The illumination taper of each beam is determined by the coupling values of the couplers and the setting of the T/R module attenuator. There is disclosed a first embodiment including two beamformers and a second embodiment extending the concept to more than two beamformers.

16 Claims, 6 Drawing Sheets

ARRAY BEAMFORMER USING UNEQUAL POWER COUPLERS FOR PLURAL BEAMS

The Government has rights in this invention pursuant to Contract No. F30602-88-C-0080, awarded by the Department of the Air Force.

BACKGROUND OF THE INVENTION

This invention relates generally to phased array radar systems and, more particularly, to an array beamformer which supports the simultaneous formation of plural beams.

In phased array microwave radar systems, it is often required to form two or more simultaneous beams on receive having different weightings. As an example, it may be required to form a sum beam having Taylor weighting and a difference beam having a Bayliss weighting, along a linear array of, illustratively, sixty-four radiating elements.

The beamforming architecture described in this discussion of the prior art is typically used for a single column of a phased array to form two beams on receive. Similar architecture may be used to combine columns into a two dimensional array. One transmit/receive (T/R) module is used per element location. The T/R module typically contains high power amplifiers for transmit, low noise amplifiers for receive, a phase shifter for beam steering, and a level set attenuator. In order to simplify the module design and control functions, it is desirable to use only one phase shifter and one attenuator for both beams.

In accordance with a typical prior art beamforming system, the output of each T/R module on receive is divided in the 1:2 output power coupler to provide equal power levels, which are applied to two distinct, N:1 unequal-split power combiners (beamformers), which form the individual beams. The use of the single phase shifter in the T/R module puts the requirement for phase tracking between the beams on the beamformers. The use of the single attenuator in the T/R module adds the requirement that the beamformers must provide the difference in weighting between the beams. It should be noted that the attenuator in the module provides one degree of amplitude control; the beamformer has only to supply the difference in amplitudes between the beams.

A prior approach for achieving the weighted amplitude distribution required for the N:1 combiners/beamformers is the use of a series of unequal-split 2:1 planar Wilkinson power dividers. The design effort required to implement this approach is time consuming, highly iterative, complex and expensive. Furthermore, the outputs of unequal-split Wilkinson power dividers do not phase track across a frequency band, and, as such, phase compensation networks are required. In the production of such power dividers, accurate control of line width tolerances is needed to minimize amplitude errors, and accurate control of line length tolerances is needed to minimize phase errors.

SUMMARY OF THE INVENTION

It is therefore an object of the present invention to provide an array beamformer for use in a phased array, microwave radar system.

It is an additional object of the present invention to provide such a beamformer which supports the formation of plural simultaneous beams on receive having different weightings.

It is a further object of the present invention to provide such a beamformer which avoids the design complexity occasioned by the use of distinct, unequal-split power combiners.

In accordance with the principles of the present invention, there is disclosed herein an apparatus for use in a phased array radar system. The apparatus comprises N radiating elements, N attenuators coupled individually to the N radiating elements, and N power couplers coupled individually to the N attenuators, each of the power couplers splitting the power received by the corresponding radiating element into first and second power components. First and second identical N:1 combiners are responsive, respectively, to the N first and second power components, the first and second combiners shaping first and second distinct beams simultaneously.

In accordance with another aspect of the present invention, there is disclosed a phased array radar system comprising an antenna including N radiating elements, N transmit/receive (T/R) modules coupled individually to the N radiating elements, each of the T/R modules including a phase shifter and an attenuator. The radar system also comprises N power couplers coupled individually to the N T/R modules, each of the power couplers splitting the power received by the corresponding radiating element into first and second components. Finally, the radar system comprises first and second identical N:1 combiners responsive, respectively, to the first and second power components, the first and second combiners shaping first and second distinct beam simultaneously.

In accordance with a preferred embodiment of the present invention, the N power couplers comprise overlay hybrid couplers, and at least one is an unequal-split power coupler. Further in accordance with a preferred embodiment, the first and second N:1 combiners comprise equal-split combiners. Still further in accordance with the preferred embodiment, the N radiating elements are disposed in a linear configuration so as to form a single column of a phased array antenna.

With this arrangement, an array beamformer for plural beams is disclosed, which beamformer is far simpler in design and production than beamformers of the prior art which use N:1 unequal-split power combiners. By using N:1 equal-split power combiners, the beamformer of the present invention also eliminates the need for phase compensation networks in the power combiners.

BRIEF DESCRIPTION OF THE DRAWING

The foregoing features of the present invention and the advantages thereof may be fully understood from the following detailed description read in conjunction with the accompanying drawing wherein.

DESCRIPTION OF THE PREFERRED EMBODIMENT

Apparatus for use in a phased array microwave antenna includes radiating elements, transmit/receive (T/R) modules, hybrid couplers with unequal coupling values, and identical, N:1 equal-amplitude-split combiners, where N is the number of radiating elements in a column of the phased array.

Figure 1:
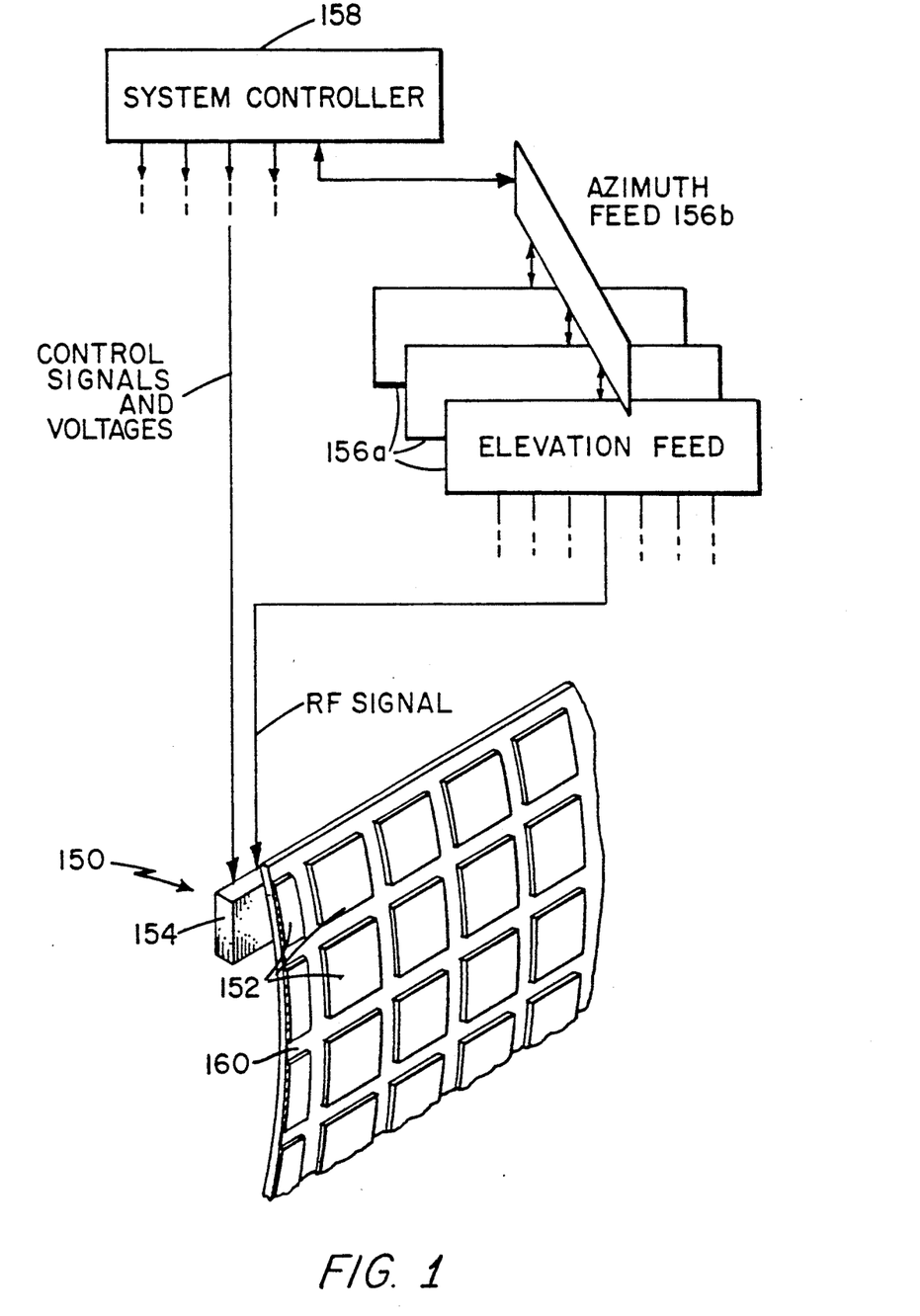
FIG. 1 is a simplified sketch of a phased array antenna system which may include the present invention.

Referring initially to FIG. 1, it may be seen that a phased array antenna 150 according to the present invention includes a plurality of radiators 152 mounted on a surface 160, which surface 160 may conform to the curved (outer surface of the skin of an aircraft (not shown). Each radiator 152 is fed by a corresponding T/R module 154 attached to the inner side opposite surface 160. T/R modules 154 are driven by an RF feed network of RF power dividers comprising elevation feeds 156a and azimuth feeds 156b, which provide RF signals to each of the T/R modules 154. Phase information is supplied to each T/R module 154 through the system controller 158. System controller 158 originates the RF feed signals to the RF power dividers in feeds 156a and 156b, as well as control signals and voltages to the plurality of T/R modules 154.

Figure 2:
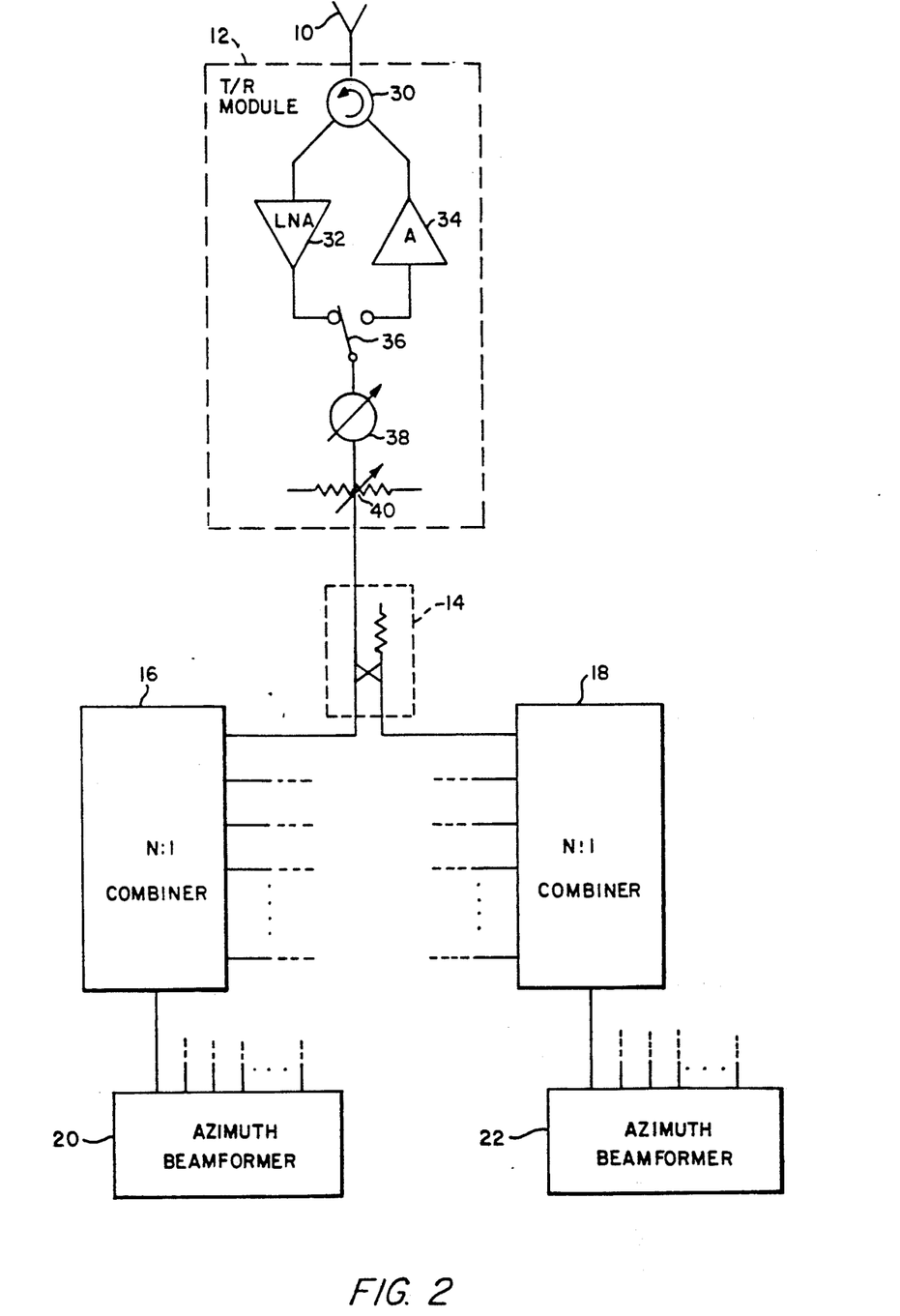
FIG. 2 illustrates an array beamformer in accordance with the present invention.

Referring now to FIG. 2, there is shown an array beamforming apparatus in accordance with a preferred embodiment of the present invention. The apparatus includes radiating element 10, T/R module 12, unequal-split power coupler 14, first and second N:1 equal-split combiners 16 and 18, and azimuth beamforming networks 20 and 22. Although only one radiating element 10, one T/R module 12, and one power coupler 14 are shown, it should be noted that each input of combiner 16 and the corresponding input of combiner 18 is coupled to a similar combination of radiating element 10, T/R module 12 and power coupler 14. The totality of radiating elements 10 are preferably arranged in a linear array, typically forming a single column along a two-dimensional array of elements of the type shown in FIG. 1, and the positioning of these elements 10 along the linear array corresponds, in the preferred configuration, to the input positions of combiners 16 and 18.

In the present example, radiating element 10 may comprise a patch radiator on a planar or curved surface which is formed by a multiplicity of such elements 10. T/R module 12 illustratively comprises a level set attenuator 40, a phase shifter 38, a T/R switch 36, a low noise amplifier 32 in the receive path, a high power amplifier 34 in the transmit path, and a circulator 30 for the appropriate steering of the transmit and receive signals. Attenuator 40 is preferably a programmable attenuator for which different levels of attenuation may be established for the transmit and receive modes. In practice, attenuator 40 may comprise a first attenuator in the combined transmit/receive path, and a second attenuator in the receive path such that the attenuation on receive is the sum of these first and second attenuators. Phase shifter 38 is, by way of example, a 6-bit phase shifter.

Unequal-split power coupler 14 is illustratively an overlay hybrid coupler. This device can provide a coupling value from 3 dB to in excess of 40 dB. Combiners 16 and 18 are illustratively 64:1 equal-split combiners. A preferred configuration of a 32:1 equal-split combiner, which may comprise half of the illustrative 64:1 combiner 16 or combiner 18, is shown in greater detail in FIG. 3. Azimuth beamforming networks 20 and 22 are beamformers for shaping in azimuth the beams formed by combiners 16 and 18, respectively. The inputs to beamformers 20 and 22 shown unconnected in FIG. 2, are, in the full implementation of a two-dimensional phased array antenna system, connected, respectively, to other N:1 combiners, not explicitly shown in FIG. 2, corresponding to other columns in the array.

Although, in the preferred embodiment, combiners 16 and 18 are described as equal-split combiners, this limitation is driven by the requirement that the beamformer of the present invention transmits a uniform taper. Absent this requirement, combiners 14 and 16 may be configured as identical N:1 combiners having a predetermined taper. Such combiners 16 and 18 would then form distinct beams on receive by virtue of the unequal power splits provided by the N power couplers 14.

In an illustrative configuration, radiator 10 and T/R module 12 are combined into an "attennule" architecture, which may be plugged into a socket on a circuit board (not shown) underlying the array, thereby positioning radiator 10 in the plane of the array. In this arrangement, the circuit board may comprise a multilayer structure including combiners 16 and 18 fabricated as stripline or microstrip conductors, and unequal-split couplers 14 fabricated as overlay hybrid couplers. It will be seen that by using this arrangement, the illumination taper may be altered by replacement of the overlay hybrid couplers and by adjustment of the attenuator in the T/R module.

Figure 3:
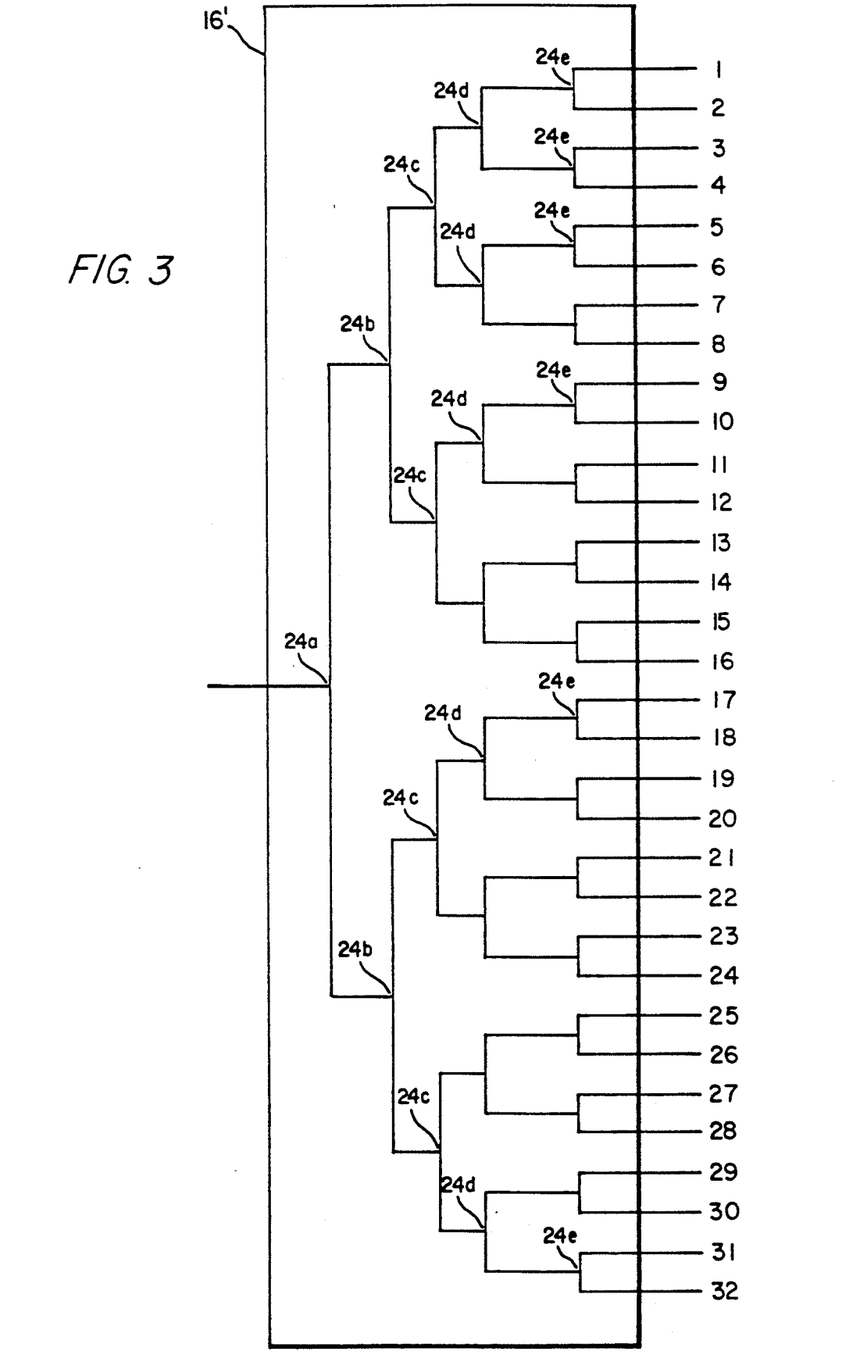
FIG. 3 illustrates the coupling arrangement within a typical combiner of the FIG. 2 embodiment.

Referring to FIG. 3, there is shown a power combiner 16', which may represent half of combiner 16 described in relation to FIG. 2. Combiner 16' comprises a corporate feed structure of equal-split power combiners. For the example of the 32:1 power combiner illustrated by FIG. 3, sixteen equal-split power combiners 24e feed eight equal-split power combiners 24d, which feed four equal-split power combiners 24c, which feed two equal-split power combiners 24b, which feed a single equal-split power combiner 24a. Thus, the signals applied to each of the 32 inputs of combiner 16' pass through five equal-split power combiners for a total attenuation therethrough of 5×3.01 dB=15.05 dB. Furthermore, such configuration additionally provides an equal phase relationship of all signals through combiner 16'.

Figure 4:
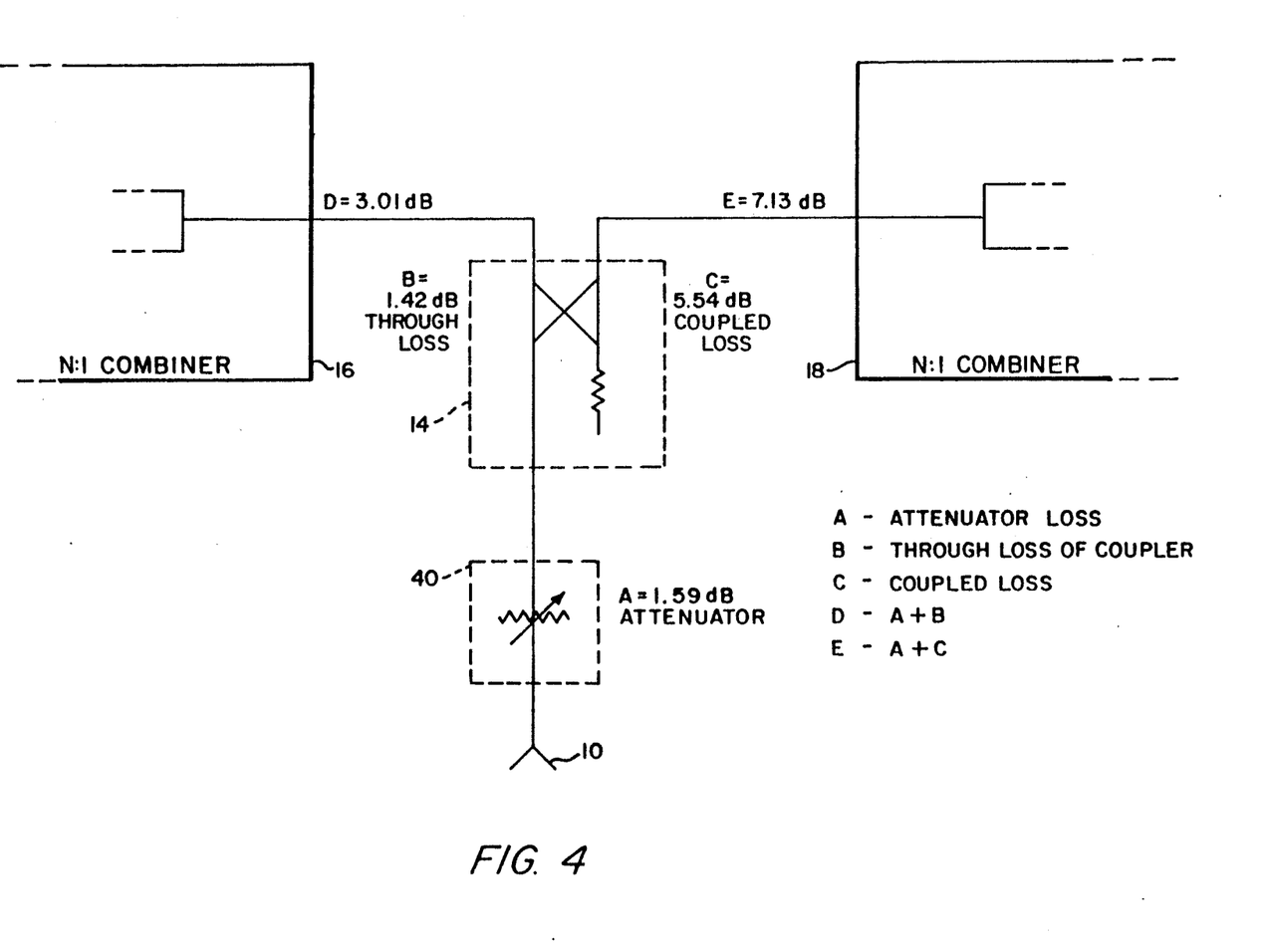
FIG. 4 depicts the power coupling losses from a single beam signal through to an illustrative array element.

Referring to FIG. 4, there are shown the loss elements in the set of paths between a radiating element 10 and a pair of combiners 16 and 18. Such loss elements include attenuator 40 (part of T/R module 12 as shown in FIG. 2) and coupler 14. In this depiction, "A" represents the dB loss through attenuator 40, "B" represents the dB loss along the "through" path of coupler 14, and "C" represents the dB loss along the "coupled" path of coupler 14. Therefore, "D"="A"+"B" is the total loss applied to one of the N inputs of combiner 16, and "E"="A"+"C" is the total loss applied to the corresponding one of the N inputs of combiner 18.

In the numerical example shown herein by way of illustration, attenuator 40 is set at 1.59 dB, and power coupler 14 provides an attenuation of 1.42 dB along the through path and 5.54 dB along the coupled path. Thus, in this example, the accumulated loss presented at a first input of combiner 16 is 3.01 dB, and the accumulated loss presented at the corresponding input of combiner 18 is 7.13 dB.

Figure 5:
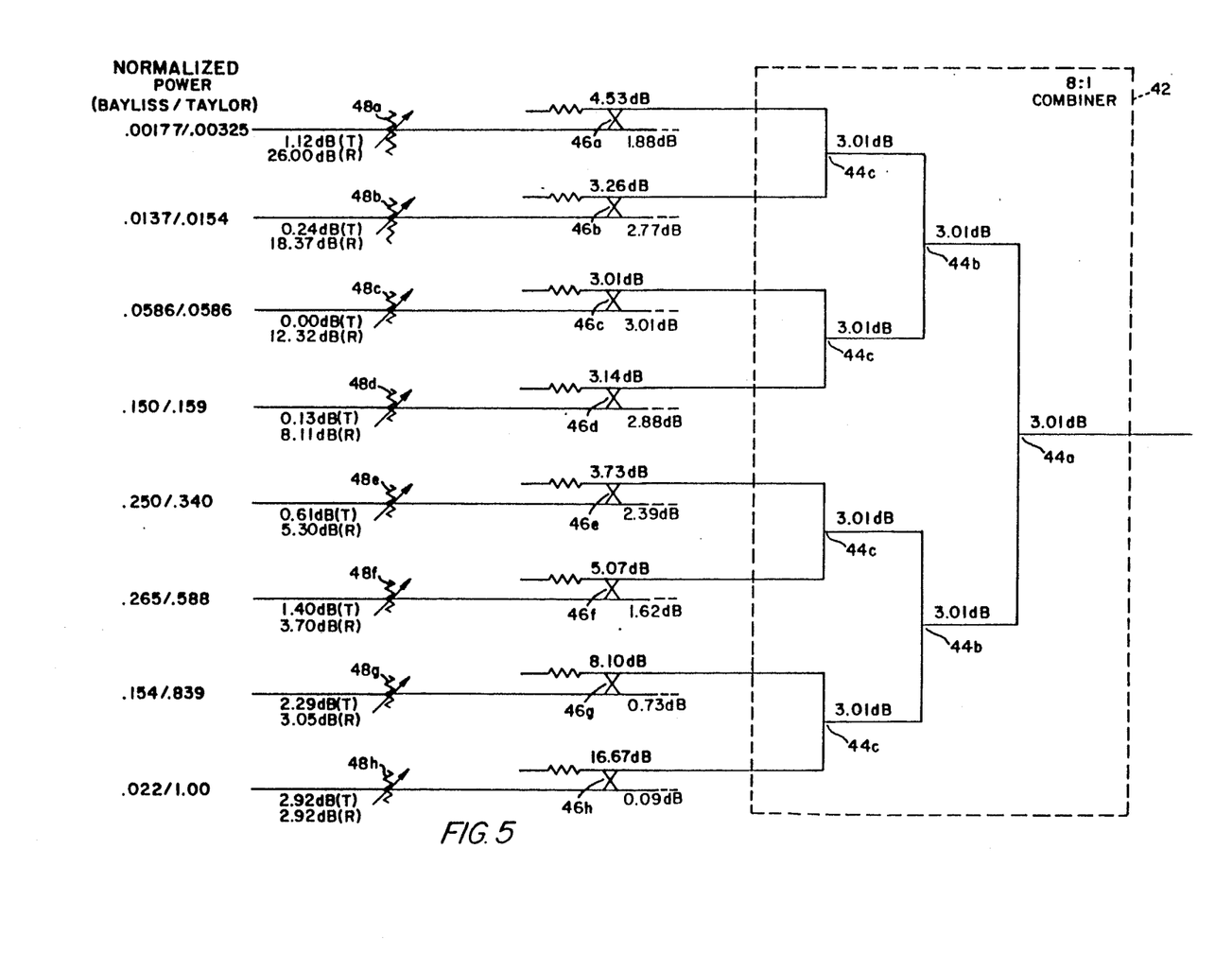
FIG. 5 illustrates the power levels in an illustrative eight-element distribution network beamformer in accordance with the embodiment of FIG. 2.

Referring to FIG. 5, there is shown an illustrative eight-element distribution network beamformer including coupling values and attenuation levels for exemplary illumination tapers. This figure illustrates an 8:1 equal-split combiner 42 comprising four 2:1 equal-split power combiners 44c, two 2:1 equal-split power combiners 44b and one 2:1 equal-split power combiner 44a. Eight attenuators 48a–48h are electrically connected to eight power couplers 46a–46h, respectively, and the coupled outputs therefrom are individually connected to the eight inputs to combiner 42. Although not explicitly shown in FIG. 5, it will be understood from FIG. 2 and the accompanying text, that the through paths from couplers 46a–46h are connected to another 8:1 equal-split combiner, similar to combiner 42.

In this example, the beamformer will provide on receive a portion of a Taylor weighting on the through paths of power couplers 46a–46h, and a portion of a Bayliss weighting on the coupled paths of power couplers 46a–46h. Furthermore, the beamformer will provide on transmit a uniform taper on the through paths of power couplers 46a–46h, and, therefore, a Bayliss÷Taylor weighting on the coupled paths. Once the coupling ratios of power couplers 46a–46h have been established, the values of attenuators 48a–48h on transmit may be determined for either the uniform (through path) taper or the Bayliss÷Taylor (coupled path) taper. Finally, after the transmit mode attenuations have been established, the additional attenuations for the receive mode may be determined for either the Taylor (through path) taper or the Bayliss (coupled path) taper.

From an awareness of the concepts presented earlier, especially as demonstrated in FIG. 5, it will be appreciated by those of skill in the art that the design of a dual beamforming system in accordance with the present invention entails three steps. First, the N power ratios of the first and second beams for all N individual elements along the linear array are determined, and power couplers 46a–46h and selected therefrom. Secondly, the power ratios among the elements of one of the linear arrays are determined on transmit and, in consideration of the attenuations through power couplers 46a–46h, the transmit mode levels in the corresponding attenuators 48a–48h are set. Finally, the power ratios among the elements of one of the linear arrays are determined on receive and, in consideration of the attenuations through power couplers 46a–46h and attenuators 48a–48h in the transmit mode, the additional attenuation levels in the corresponding attenuators 48a–48h on receive are set.

By way of a numerical example, the following paragraphs detail the method by which power coupler 46a and the transmit and receive levels of attenuator 48a are selected. As shown in FIG. 5, the normalized power of the Bayliss taper at the element corresponding to attenuator 48a and power coupler 46a and is 0.00177, and the normalized power of the Taylor taper at this element is 0.00325. In order to realize the necessary power division through power coupler 46a, this device must provide an attenuation of 1.88 dB on the through path (Taylor weighting) and 4.53 dB on the coupled path (Bayliss weighting). In a similar manner, the power divisions through power couplers 46b–46h are found, and the coupling values therethrough are determined.

In accordance with the second step of this method, the values of attenuators 48a–48h are determined for the transmit mode. Considering the through paths of couplers 46a–46h (the uniform illumination taper on transmit), the maximum attenuation is 3.01 dB through coupler 46c. Accordingly, attenuator 48c is set to 0.00 dB on transmit, and each of the other attenuators 48a–48b and 48d–48h are set to values which, when added to the through path attenuation of their corresponding power couplers, provide 3.01 dB on transmit. It will be seen, for example, that for a through path attenuation of 1.88 dB in coupler 46a, attenuator 48a is set to 1.12 dB on transmit for a total attenuation therethrough of 3.01 dB (neglecting rounding errors).

Finally, in accordance with the third step of this method, the values of attenuators 48a–48h are determined for the receive mode. Considering the values of normalized power on receive, the maximum value is 1.00, associated with the Taylor weighting at the element corresponding to attenuator 48h and power coupler 46h. Accordingly, no additional attenuation is added to attenuator 48h on receive. Thus attenuator 48h has a value of 2.92 dB on both transmit and receive, and the through path attenuation on receive (Taylor taper) is 3.01 dB. Each of the other attenuators 48a–48g are set to values on receive which, when added to the through path attenuation of their corresponding power couplers, are appropriately scaled to the 3.01 dB loss through attenuator 48h and power coupler 46h. Comparing, for example, the path including attenuator 48a and coupler 46a with the path including attenuator 48h and coupler 46h, the ratio of their (Taylor weighting) normalized powers is 0.00325/1.00=0.00325, corresponding to an attenuation of 24.88 dB. Therefore, since the path including attenuator 48a and coupler 46a must be attenuated 24.88 dB with respect to the path including attenuator 48h and coupler 46h on receive, attenuator 48a is set at 24.88−1.88+3.01=26.00 dB on receive (neglecting rounding errors).

Figure 6:
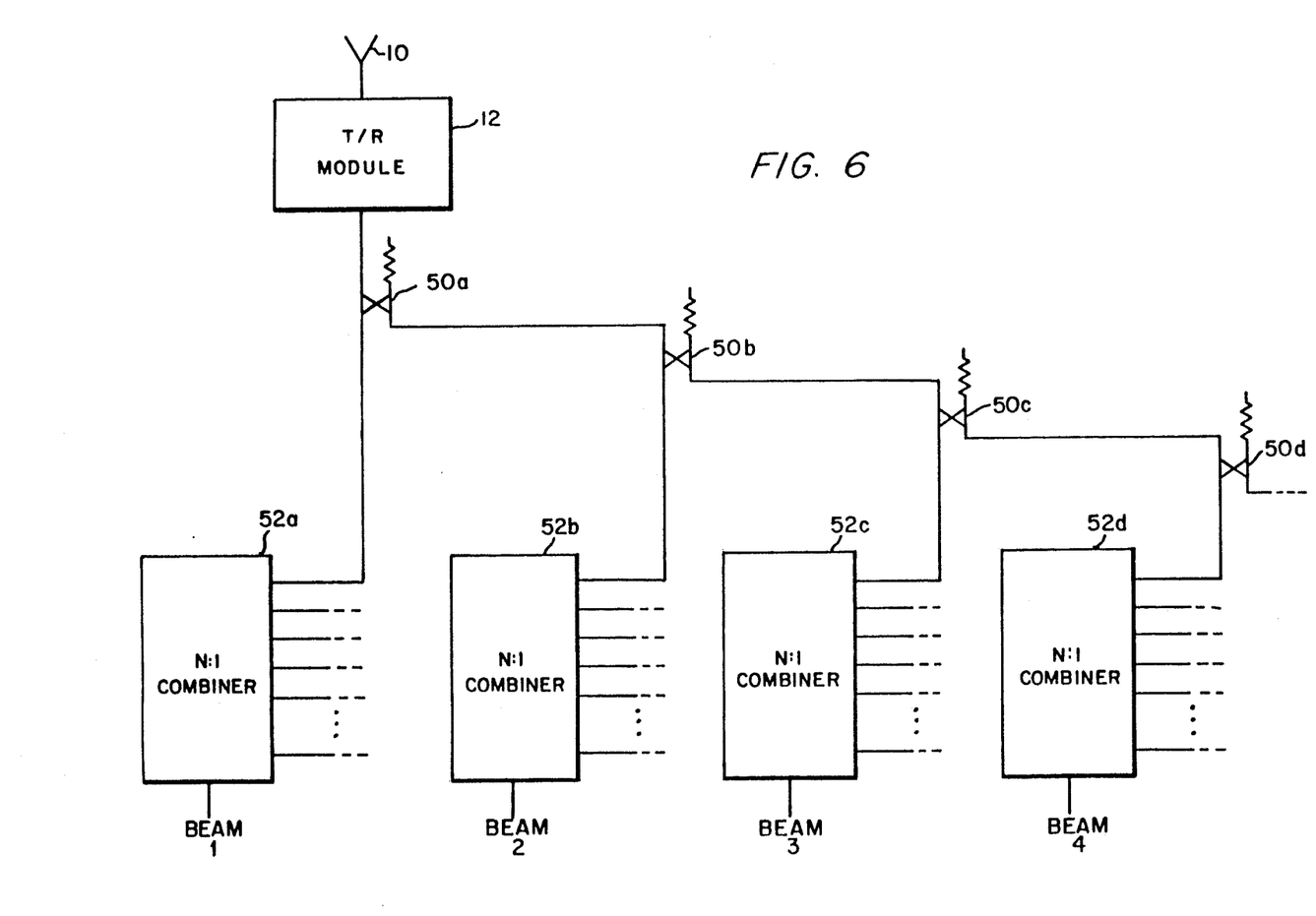
FIG. 6 illustrates an extension of the FIG. 2 embodiment to support formation of multiple beams.

Referring now to FIG. 6, there is shown an additional embodiment wherein the concept of the present invention is extended to a phased array radar system forming more than two beams simultaneously on receive. Radiating element 10 is coupled to T/R module 12, in a manner similar to the FIG. 2 embodiment, and the output of T/R module 12 is applied to unequal-split power coupler 50a. The through signal from coupler 50a is applied to one of the N inputs of N:1 equal-split combiner 52a, and the coupled signal from coupler 50a is applied to a second unequal-split power coupler 50b. Similarly, the through signal from coupler 50b is applied to an input of a second N:1 equal-split combiner 52b, corresponding to the above-mentioned input of combiner 52a, and the coupled signal from coupler 50b is applied to a third unequal-split power coupler 50c.

In a similar manner, any number of equal-split combiners 52a, 52b, 52c, . . . may be provided so as to form an expanded number of beams from a single radiating element 10 and T/R module 12. As will be recognized from an understanding of the embodiment of FIG. 2, a similar configuration of radiating elements 10, T/R modules 12, and unequal-split power couplers 50a, 50b, 50c, 50d, . . ., are applied to the N terminals of equal-split combiners 52a, 52b, 52c, 52d, . . ., to form multiple beams from a linear array of radiating elements 10.

While the principles of the present invention have been demonstrated with particular regard to the illustrated structure of the figures, it will be recognized that various departures may be undertaken in the practice of the invention. The scope of this invention is not intended to be limited to the particular structure disclosed herein, but should instead be gauged by the breadth of the claims which follow.

What is claimed is:

1. Apparatus for use in a phased array radar system, said apparatus comprising:
   N radiating elements,
   N attenuators coupled individually to said N radiating elements,
   N power couplers coupled individually to said N attenuators, at least one of said N power couplers being an unequal-split power coupler, each of said power couplers splitting the power received by the corresponding radiating element into first and second components; and
   first and second identical N:1 combiners responsive, respectively, to said N first and second power components, said first and second combiners shaping first and second distinct beams simultaneously.

2. The apparatus in accordance with claim 1 wherein said N power couplers comprise overlay hybrid couplers.

3. The apparatus in accordance with claim 1 wherein said first and second N:1 combiners comprise equal-split combiners.

4. The apparatus in accordance with claim 3 wherein each of said N:1 equal-split combiners comprises a corporate feed structure of 2:1 equal-split power combiners.

5. The apparatus in accordance with claim 1 further including N phase shifters coupled individually to said N radiating elements, said N phase shifters and said N attenuators comprising N individual transmit/receive modules.

6. The apparatus in accordance with claim 1 wherein the attenuations of each of said N attenuators are selectable between first levels on transmit and second levels on receive.

7. The apparatus in accordance with claim 1 wherein said N radiating elements are disposed in a linear configuration.

8. The apparatus in accordance with claim 1 wherein said N radiating elements are disposed so as to form a single column of a phased array antenna.

9. A phased array radar system comprising:
   an antenna including N radiating elements,
   N transmit/receive (T/R) modules coupled individually to said N radiating elements, each of said T/R modules including a phase shifter and an attenuator;
   N power couplers coupled individually to said N T/R modules, at least one of said N power couplers being an unequal-split power coupler, each of said power couplers splitting the power received by the corresponding radiating element into first and second power components; and
   first and second identical N:1 combiners responsive, respectively, to said N first and second power components, said first and second combiners shaping first and second distinct beams simultaneously.

10. The system in accordance with claim 9 wherein said N power couplers comprise overlay hybrid couplers.

11. The system in accordance with claim 9 wherein said first and second N:1 combiners comprise equal-split combiners.

12. The system in accordance with claim 11 wherein each of said N:1 equal-split combiners comprises a corporate feed structure of 2:1 equal-split power combiners.

13. The system in accordance with claim 9 wherein each of said N T/R modules includes high power amplifiers on transmit and low noise amplifiers on receive.

14. The system in accordance with claim 9 wherein the attenuations of each of said N attenuators are selectable between first levels on transmit and second levels on receive.

15. The system in accordance with claim 9 wherein said N radiating elements are disposed in a linear configuration.

16. The system in accordance with claim 9 wherein said N radiating elements are disposed so as to form a single column of said antenna.

* * * * *